Figure 1:
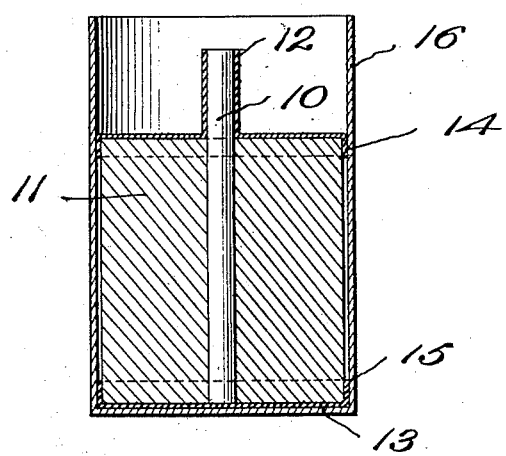

Feb. 17, 1925.

H. M. KORETZKY

DRY BATTERY CELL

Filed March 4, 1922

Harry M. Koretzky
Inventor

By his Attorney

Patented Feb. 17, 1925.

1,526,424

UNITED STATES PATENT OFFICE.

HARRY M. KORETZKY, OF NEW YORK, N. Y.

DRY BATTERY CELL.

Application filed March 4, 1922. Serial No. 541,016.

*To all whom it may concern:*

Be it known that I, HARRY M. KORETZKY, a citizen of the United States, residing in New York, county and State of New York, have invented a certain Improvement in Dry Battery Cells, of which the following is a specification.

The present invention has relation to an improved form of dry battery cell, and to the process of making the same.

The standard type of dry cells now in use comprises an external zinc cup forming one electrode, in combination with a central carbon electrode within a thick envelope of depolarizing mixture constituting a "core", and an electrolyte occupying the space between this core and the cup. The upper portion of the cup is generally filled with an insulating sealing compound. The composition of the electrolyte and of the depolarizing mixture varies greatly in different makes of battery, and a variety of details of construction have been introduced in the cell design, but the elements above named are generally adopted in common by all makers of dry cells.

In forming the core, some makers have used a cloth tied around the relatively loose depolarizing mass, to secure it to the central carbon rod, while others have used a dip for the entire core preferably of a so-called "bibulous" material. This dip on hardening serves to hold the depolarizing mass together and consolidate the core. In all of these former constructions, an insulating washer is used at the bottom of the zinc cup, and means have been employed, additional to the "core" itself for holding it in an axial position within the cup, so as to leave a space of substantially uniform width all around the core to accommodate the electrolyte. It is also common practice to dip the porous carbon rod in paraffin before incorporating it in the core.

My present invention provides a simpler, cheaper and more effective construction than has been hitherto adopted, and my improved process of manufacture accomplishes a distinct saving in time and labor.

Another advantage of my process is that the cores can be used while fresh. This prevents the formation of bubbles in the electrolytic paste, which are liable to form where the cores are stored before making up the cells. Also by using the freshly made cores, the electrolyte does not soak into the core, thus preserving the strength of the electrolyte and improving the battery.

My cell has the further advantage that the core surface is bare, thus obtaining perfect contact between the core and the electrolyte and diminishing internal resistance. By leaving the carbon unparaffined over that part of it with which the depolarizing mixture is in contact, the deleterious insulating effect of the paraffin is done away with, while I get the advantages of the paraffin coating on the exposed upper part of the carbon.

My improved construction also has the advantage that the core is automatically centred when inserted in a zinc cup, no extraneous parts being necessary to hold it in the required axial position.

I secure all these advantages by a cheap, rapid, simple and certain process of manufacture as set forth hereinafter.

Figure 2:
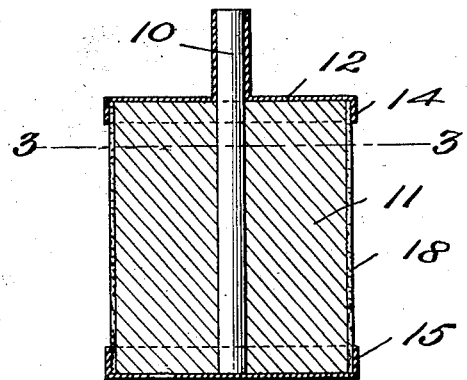
Figure 3:
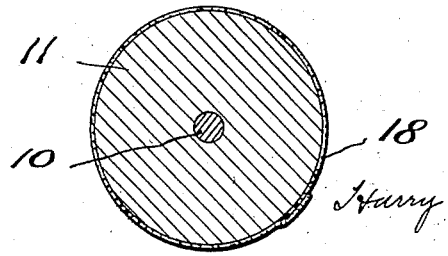

The invention is illustrated by way of example in the accompanying drawings wherein Figure 1 is a median vertical section of a cell partly completed, Figure 2 is a similar view of the core in modified form, and Figure 3 is a horizontal section on the line 3—3 in Figure 2.

In building up my core I take a carbon rod 10, free from paraffin, of the right length and diameter and mold around it in any well known manner the body of depolarizer 11. This may have any appropriate composition.

The partly completed core is then dipped, first at one end and then at the other in a bath of a quick hardening magma, such as melted paraffin. The invention is not limited to this substance, however, as cerasin, sealing wax, strong glue or even a strong paste might be used. The result of these dippings is that the upper portion of the carbon rod, as well as the entire top and a portion of the upper periphery of the core is provided with an adherent electrically neutral cap 12; while a similar cap 13 covers the bottom and a part of the lower periphery of the core. More or less of this covering will, of course, be removed from the end of the carbon, to make proper electrical contact with the usual metallic terminal cap. In the drawing the flat end of the carbon is thus shown bared.

The end caps 12 and 13 thus formed serve to support and consolidate the core, so that it can be handled as a unit with impunity in the course of manufacture. These caps have an additional function which is very important. By making the layer of paraffin or the like sufficiently thick, rims 14 and 15 are provided at the top and bottom of the core which fit tightly within the zinc cup 16, when the cell is assembled, thus automatically centring the core when it is inserted. The electrolytic fluid or paste (cooked or cold as the case may be) occupies the space 17 between the rims 14 and 15.

Owing to the fact that the cap 13 covers the bottom of the core, as shown, this bottom is effectually insulated from the zinc cup, and the insertion of the usual insulating washer is rendered unnecessary.

Figures 2 and 3 show a modification in which the security of the depolarizing material is further insured by applying a layer of bibulous material such as a piece of thin cloth 18 around the core just before dipping. No attachment other than the caps 12 and 13 themselves is necessary, the cloth being merely held in place by the operator during the dipping operations. While this is not the preferred form of the invention, it is shown and described to make it clear that the scope of the invention is not limited to the use of a bare core.

What is claimed is—

1. In a battery cell, a core comprising a carbon electrode, a body of depolarizing mixture surrounding the greater portion of said electrode, and a shell of electrically neutral magma hardened around the upper and projecting part of the carbon electrode and the adjacent portion of the depolarizing body, and adapted to fortify attachment of said body to said electrode.

2. In a battery cell, a core as in claim 1 hereof wherein a shell of hardened magma is also applied to the lower end of the core.

In testimony whereof I have hereto set my hand on this 1st day of March, 1922.

HARRY M. KORETZKY.